United States Patent
Scholz et al.

(10) Patent No.: US 9,814,249 B2
(45) Date of Patent: *Nov. 14, 2017

(54) MULTILAYERED COFFEE AND CREAMER PARTICLE BEVERAGE COMPOSITION

(75) Inventors: Martin Scholz, Hermannsburg (DE); Dean A. Lippold, Boulder, CO (US); Satwinder S. Panesar, Tullibody (GB)

(73) Assignee: Kraft Foods R&D, Inc., Deerfield, IL (US)

( * ) Notice: Subject to any disclaimer, the term of this patent is extended or adjusted under 35 U.S.C. 154(b) by 3009 days.

This patent is subject to a terminal disclaimer.

(21) Appl. No.: 12/937,536

(22) PCT Filed: Apr. 28, 2003
(Under 37 CFR 1.47)

(86) PCT No.: PCT/GB03/01830
§ 371 (c)(1),
(2), (4) Date: Jun. 1, 2011

(87) PCT Pub. No.: WO2004/095937
PCT Pub. Date: Nov. 11, 2004

(65) Prior Publication Data
US 2012/0301592 A1    Nov. 29, 2012

(51) Int. Cl.
*A23F 5/00* (2006.01)
*A23C 11/00* (2006.01)
*A23F 5/40* (2006.01)
*A23F 5/46* (2006.01)

(52) U.S. Cl.
CPC ........... *A23C 11/00* (2013.01); *A23F 5/40* (2013.01); *A23F 5/465* (2013.01)

(58) Field of Classification Search
USPC .................. 426/45, 594, 432, 596
See application file for complete search history.

(56) References Cited

U.S. PATENT DOCUMENTS

| | | | |
|---|---|---|---|
| 4,410,552 A * | 10/1983 | Gaffney et al. | 426/103 |
| 5,882,717 A * | 3/1999 | Panesar et al. | 426/595 |
| 5,894,031 A | 4/1999 | Caly et al. | |
| 6,048,567 A | 4/2000 | Villagran et al. | |
| 6,129,943 A | 10/2000 | Zeller et al. | |
| 6,207,206 B1 * | 3/2001 | Mickowski et al. | 426/249 |
| 6,277,429 B1 | 8/2001 | Zeller et al. | |
| 6,399,133 B2 * | 6/2002 | Dubberke | 426/552 |
| 6,838,110 B2 * | 1/2005 | Wragg et al. | 426/594 |
| 7,232,584 B2 * | 6/2007 | Rabinovitch et al. | 426/306 |
| 8,529,973 B2 * | 9/2013 | Massey et al. | 426/89 |
| 2003/0005826 A1 | 1/2003 | Sargent et al. | |

FOREIGN PATENT DOCUMENTS

| | | |
|---|---|---|
| EP | 0 324 072 A1 | 7/1989 |
| EP | 0 377 849 A1 | 7/1990 |
| EP | 0 813 815 A1 | 12/1997 |
| EP | 0 941 666 A1 | 9/1999 |
| EP | 0 494 384 B1 * | 3/2001 |
| JP | 01-199543 A | 8/1989 |
| JP | 2831075 B2 | 9/1998 |
| WO | 99/39587 A1 | 8/1999 |
| WO | WO 0180660 A1 * | 11/2001 |
| WO | 02/24946 A2 | 3/2002 |
| WO | 02/49450 A2 | 6/2002 |
| WO | 02/087351 A1 | 11/2002 |

OTHER PUBLICATIONS

Sigma-Aldrich Particle Size Conversion Chart, http:www.sigmaaldrich.com, Feb. 14, 2003.*
Toblerone(R), website http://www.toblerone.com/tobleronel/page?siteid=tobleronel-prd&locale=usen1&PagecRef=586, p. 3, Oct. 2002.*
Article Latte Macchiato—3 Layered Coffee by Clara, Apr. 7, 2003, www.food.com.*
International Searching Authority (European Patent Office) International Search Report dated Jan. 28, 2004 for International Application No. PCT/GB03/01830, 4 pages.
International Preliminary Examining Authority (European Patent Office) Notification of Transmittal of the International Preliminary Examination Report dated Mar. 29, 2005 for International Application No. PCT/GB03/01830, 8 pages.
European Patent Office Communication Pursuant to Article 96(2) EPC (examination of the application) dated Dec. 1, 2006 for European Application No. 03 799 423.3, 3 pages.

* cited by examiner

*Primary Examiner* — Tamra L Dicus
(74) *Attorney, Agent, or Firm* — Fitch, Even, Tabin & Flannery LLP

(57) ABSTRACT

A coffee composition or creamer composition comprising: a) instant coffee and/or a creamer; and b) confectionery particle comprising a chocolate and having a size of at least 1 mm.

15 Claims, No Drawings

MULTILAYERED COFFEE AND CREAMER PARTICLE BEVERAGE COMPOSITION

CROSS-REFERENCE TO RELATED APPLICATIONS

This application is a U.S. national phase application filed under 35 U.S.C. §371 of International Application PCT/GB2003/001830, filed on Apr. 28, 2003, designating the United States, which is hereby incorporated herein by reference in its entirety.

The present invention relates to coffee and creamer compositions, particularly to compositions having enhanced consumer acceptability.

Coffee compositions and creamer compositions are well known. A coffee composition can be made into a coffee drink simply by the addition of hot water. A creamer composition can be added to a coffee composition or to a coffee drink in order to provide a whitening effect, which may also be accompanied by foaming.

Coffee compositions and creamer compositions usually have a uniform appearance and, when diluted, form a uniform drink. While this is acceptable for many consumers, there is always a need to provide consumers with new products which provide a different experience.

The present invention provides a coffee composition comprising:
a. instant coffee; and
b. confectionery particles comprising a chocolate and having a size of at least 1 mm.

The present invention also provides a creamer composition comprising:
a. a creamer; and
b. confectionery particles comprising a chocolate and having a size of at least 1 mm.

The present invention additionally provides a process for preparing a coffee drink, which comprises mixing hot water with a coffee composition as defined above.

The present invention further provides a process for preparing a white coffee drink, which comprises mixing together a coffee drink and a creamer composition as defined above.

The coffee composition and the creamer composition of the present invention both contain confectionery particles comprising a chocolate and having a size of at least 1 mm. It has been found that incorporation of these confectionery particles provides a consumer with a number of advantages.

One advantage is that the product has a more attractive appearance than the uniform products of the prior art. The confectionery particles, comprising a chocolate, will usually have a brown colour, although this can be varied if desired, for example by using white or dark chocolate or by food dyes or colourings. The confectionery particles, having a size of at least 1 mm, are generally larger than the instant coffee or creamer particles. It has been found that this appearance is perceived to, be more attractive by consumers and, furthermore, provides a visual differentiation of the compositions from known compositions.

Another advantage is that the drink formed from the compositions has a difference in taste and mouthfeel at different stages. It is known in the prior art to provide a mixture of instant coffee and cocoa powder. On dilution with hot water a uniform drink is produced tasting of a mixture of coffee and chocolate. In contrast to this, the coffee composition of the present invention, when diluted with water, does not form a uniform composition. Instead the confectionery particles, which comprise a chocolate and therefore generally have a density of greater than 1 g/cm$^3$, sink to the bottom of the coffee drink. After the coffee drink has been formed, the chocolate constituting the confectionery particles, and optionally other parts of the confectionery particles or all of the confectionery particles, melts producing a chocolate layer at the bottom of the drink. Depending on the time elapsed before the coffee drink is consumed, and the manner in which the coffee drink is consumed, a consumer can experience the chocolate layer in different ways. For example, the coffee drink can be decanted from the top of the layer, and the chocolate layer subsequently consumed to provide an attractive finish to the drink. Another possibility is that the chocolate layer is drunk through the coffee drink, providing the consumer with the simultaneous taste of coffee and chocolate but with the enhanced mouthfeel of molten chocolate. The chocolate particles may generate a viscous mouth coating from the chocolate fat and provide a textural cue which is liked by consumer.

A creamer composition according to the present invention has similar advantages. When the creamer composition is added to a coffee composition, and hot water added thereto, or when a creamer composition is added to a coffee drink, the creamer will whiten the coffee and, optionally, form a cappuccino effect if it is a foaming creamer. The confectionery particles comprising a chocolate will again form a chocolate layer at the bottom of the coffee drink, leading to the advantages discussed above in relation to the coffee drink.

Depending on the nature of confectionery particles, there may be further advantages, as discussed below.

In accordance with the present invention, the confectionery particles comprise a chocolate and have a size of at least 1 mm. The size of the confectionery particles is determined by Sympatec Helos laser diffraction coupled with multiple imaging for determining irregular shapes. An Axiophot Photomicroscope linked to Sony CCD (Colour) camera, Digital DVD and Image Pro Software may be used to determine shape and size of chocolate particles at a speed of 50 frames per second. Preferably the confectionery particles have a size of from 1 to 20 mm, more preferably from 1 to 14 mm, and even more preferably from 1 to 9 mm. The confectionery particles also preferably have a size of at least 2 mm, more preferably at least 4 mm. Desirably the average particle size of the confectionery particles, is from 2 to 10 mm, especially 5 to 8 mm. It is, of course, also possible for confectionery particles comprising a chocolate having a size of 1 mm or less, for example cocoa powder, to be present in the coffee or creamer composition in order to provide the additional benefit of a uniform chocolate taste to the drink when it is consumed.

The chocolate constituting the confectionery particles can be any chocolate, for example white, milk or dark chocolate.

The confectionery particles may consist of one or more chocolates, for example a single white, milk or dark chocolate or a mixture of different chocolates, such as a white and dark chocolate to provide an enhanced visual effect. It is also possible for the chocolate to be flavoured, for example with a mint, coffee or orange flavour.

The chocolate may have a uniform composition, or may be a mixture of chocolates having different compositions. For example, the confectionery particles may comprise an aerated chocolate or a combination of a solid chocolate and an aerated chocolate. A suitable aerated chocolate is aero (trade mark). The aerated chocolate may assist in generating foam to provide an enhanced cappuccino effect.

It is also possible for the confectionery particles to comprise a non-chocolate part such as a toffee, fudge, biscuit, cheese, nougat, flavouring, or an active ingredient such as a pharmaceutically active compound, a vitamin or health well being ingredient as Ginsing, herbs, Camomile, ginger or peppermint. Different effects can be achieved by the use of different non-chocolate parts. For example, non-chocolate part which melts in a hot drink can be used to augment or modify the flavour of the chocolate layer produced in the drink. For example, by having a toffee or fudge which has a relatively low viscosity at the temperature of a coffee drink it is possible to incorporate a toffee or fudge flavour to the chocolate layer. A similar effect can be achieved by use of small particles of a non-melting non-chocolate part.

A further advantage can be achieved by ensuring that there is a different density for the chocolate part and the non-chocolate part. If the non-chocolate part has a density of less than 1 g/cm$^3$, it will tend to float on the top of the coffee drink providing a yet further enhanced taste or mouthfeel experience for the consumer.

In a preferred embodiment, the confectionery particles preferably have a density of greater than 1 g/cm$^3$ and comprise:
i) a chocolate part; and
ii) a non-chocolate part, preferably having a density of less than 1 g/cm$^3$.

The chocolate part may have any density, for example of less than or greater than 1 g/cm$^3$.

The confectionery particles can comprise the chocolate part and the non-chocolate part in any form. Thus, for example, the confectionery particles may comprise a non-chocolate cord at least partially covered by a chocolate, for example the core may be greater than 50%, greater than 75%, greater than 90% or 100% covered by a chocolate, as determined by the surface area of the core. Alternatively the confectionery particles may comprise a chocolate with non-chocolate particles embedded therein.

The non-chocolate part may have any density, but if it has a density of less than 1 g/cm$^3$ it will be released by the chocolate when it melts and float to the surface of the coffee drink. This can provide the consumer with a novel experience of a multi-layered drink, comprising the lower chocolate layer, the middle coffee drink layer and a further layer on top of the drink, for example as a separate layer if the non-chocolate part is liquid or melts or as discreet particles of the non-chocolate part remains solid.

As a further embodiment the non-chocolate part may, for example, be a liquid, such as a flavouring agent, for example a coffee, mint or citrus flavouring agent, or a liquor. Depending on the density of the liquid it may form a separate layer in the coffee drink or may simply be mixed with the bulk of the drink.

Preferred confectionary particles a chocolate granules, especially granules of daim (trade mark), toblerone (trade mark) and/or terry's orange chocolate (trade mark).

In a further embodiment an aroma, for example a coffee aroma or volatile aroma (e.g. vanilla or orange) can be encapsulated in capsules as disclosed in WO 02/24946, WO 02/49450, WO 02/058381 and then added to the composition. The aroma is released when hot water is added to the formulation. Capsules containing aroma such as vanilla can also be obtained from Flavour houses such as IFF. These capsules can be added into the formulation or incorporated in the confectionery particles, especially in the chocolate or non-chocolate part.

The confectionery particles, in particular the chocolate part and/or the non-chocolate part, may have gas bubbles entrapped therein. Such bubbles typically have a size of 1 to 20 µm. These bubbles can be released to generate foam in the drink.

The confectionery particles may comprise the chocolate part and non-chocolate part in any proportion. For example the weight ratio of the chocolate part to the non-chocolate part may be from 20:1 to 1:20, more preferably 10:1 to 1:10 and even more preferably 5:1 to 1:5.

The coffee composition of the present invention also comprises an instant coffee. Such instant coffees are well known to those skilled in the art. The coffee composition may also comprise a creamer, for example a non-foaming and/or a foaming creamer, again as well known to those skilled in the art and as described, for example, in U.S. Pat. No. 6,048,567, U.S. Pat. No. 6,129,943 and U.S. Pat. No. 6,277,429.

Similarly the creamer composition of the present invention may comprise a creamer, for example as described above.

Both the coffee composition and the creamer composition of the present invention may comprise additional components, for example sweeteners such as glucose or sucrose or artificial sweeteners such as saccharin or aspartame. The compositions may also comprise further components such as flavourings and/or colourings.

The coffee composition and the creamer composition of the present invention generally comprise from 1 to 50 wt % of the confectionery particles, preferably from 1 to 20 wt %, more preferably from 1 to 15 wt % and even more preferably from 5 to 15 wt %, based on the total weight of the composition.

In order to prepare the compositions of the present invention the components can simply be mixed together in any order.

The present invention is now further described in the following Examples, in which all parts and percentages are by weight unless otherwise stated.

EXAMPLE 1

The following composition was prepared by mixing together the components.

Foaming creamer—(supplier Keivit)=31%

Non-foaming creamer (supplier Keivit)=9.6%

Sugar (supplier Tate & Lyle)=37.7%

Coffee—Maxwell House=5%

Cocoa powder—Suchard=4%

Flavour (Vanilla supplied by IFF)=0.6%

Salt=0.6%

Chocolate granules (Toblerone), sizes ranging, from 1 to 9 mm, average size 5 mm=11.5%

The composition was used to prepare a drink by mixing it with hot-water.

A sensory panel of 36 participants showed a marked liking of the composition against one without the Toblerone granules. The numbers preferring the composition of the present invention are as follows:

Visual cue=24

Taste (Coffee and chocolate combination)=32

Mouthfeel=23

Texture=24

EXAMPLE 2

The following composition was prepared by mixing together the components.
Foaming creamer—(supplier Keivit)=31%
Non-foaming creamer (supplier Keivit)=9.6%
Sugar (supplier Tate & Lyle)=37.7%
Coffee—Maxwell House=5%
Cocoa powder—Suchard=4%
Flavour (Caramel supplied by IFF)=0.6%
Salt=0.6%
Chocolate granules (Diam), sizes ranging from 1 to 9 mm, average size 5 mm=11.5%.

The composition was used to prepare a drink by mixing it with hot water.

A sensory panel of 36 participants showed a marked liking of the composition against one without Diam. The numbers preferring the composition of the present invention are as follows:
Visual cue=23
Taste (Coffee and chocolate combination)=32
Mouthfeel=26
Texture=22
Foam=18

EXAMPLE 3

The following composition was prepared by mixing together the components.
Foaming creamer—(supplier Keivit)=34%
Non-foaming creamer (supplier Keivit)=11.6%
Sugar (supplier Tate & Lyle)=37.7%
Cocoa powder—Suchard=4%
Flavour (Vanilla supplied by IFF)=0.6%
Salt=0.6%
Chocolate granules (Toblerone), sizes ranging from 1 to 9 mm, average size 5 mm=11.5%

The composition was used to prepare a drink by mixing it with instant coffee and hot water.

A sensory panel of 36 participants showed a liking of the composition against one without Toblerone. The numbers preferring the composition of the present invention are as follows:
Visual cue=23
Taste (Creamer and chocolate combination)=24
Mouthfeel=20
Texture=21
Foam=18

EXAMPLE 4

The following composition was prepared by mixing together the components.
Foaming creamer—(supplier Keivit)=29%
Non-foaming creamer (supplier Keivit)=10%
Sugar (supplier Tate & Lyle)=38%
Cocoa powder—Suchard=4%
Flavour (Caramel supplied by IFF)=0.6%
Salt=0.6%
Chocolate granules (Toblerone), sizes ranging from 1 to 9 mm, average size 5 mm=17.8%

The composition was used to prepare a drink by mixing it with coffee and hot water.

A sensory panel of 36 participants showed a liking of the composition against one without Toblerone. The numbers preferring the composition of the present invention are as follows:
Visual cue=25
Taste (Coffee and chocolate combination)=24
Mouthfeel=22
Texture=21
Foam=19

EXAMPLE 5

The following composition was prepared by mixing together the components.
Foaming creamer—(supplier Keivit)=30%
Non-foaming creamer (supplier Keivit)=10%
Sugar (supplier Tate & Lyle)=37%
Coffee—Maxwell House=5%
Cocoa powder—Suchard=4%
Flavour (Vanilla supplied by IFF)=0.6%
Salt=0.6%
Chocolate granules (Luftlee), sizes ranging from 1 to 9 mm, average size 5 mm=12.8%.
Luftlee—Milk chocolate with aerated centre. Outer higher density coating=30%, Inner light density (0.6 $g/cm^3$)=70%

The composition was used to prepare a drink by mixing it with hot water.

A sensory panel of 36 participants showed a marked liking of the composition against one without Luftlee. The numbers preferring the composition of the present invention are as follows:
Taste (Coffee and chocolate combination)=24
Mouthfeel=27
Texture=23
Foam=22

EXAMPLE 6

The following composition was prepared by mixing together the components.
Foaming creamer—(supplier Keivit)=30%
Non-foaming creamer (supplier Keivit)=10%
Sugar (supplier Tate & Lyle)=37%
Coffee—Maxwell House=5%
Cocoa powder—Suchard=4%
Flavour (Vanilla supplied by IFF)=0.6%
Salt=0.6%
chocolate granules (Tender), sizes ranging from 1 to 9 mm, average size 5 mm=12.8%
Tender—chocolate with crème aerated centre. Outer higher density coating=20%, Inner light density (0.6 $g/cm^3$)=80%

The composition was used to prepare a drink by mixing it with hot water.

A sensory panel of 36 participant showed a marked liking of the composition against one without Tender. The numbers preferring the composition of the present invention are as follows:
Taste (Coffee and chocolate combination)=25
Mouthfeel=22
Texture=19
Foam=19

EXAMPLE 7

The following composition was prepared by mixing together the components.
Foaming creamer—(supplier Keivit)=31%
Non-foaming creamer (supplier Keivit)=11%
Sugar (supplier Tate & Lyle)=37%

Coffee—Maxwell House=5%
Cocoa powder—Suchard=4%
Flavour (Vanilla supplied by IFF)=0.5%
Salt=0.5%
chocolate granules (Bouches), sizes ranging from 1 to 9 mm, average size 5 mm=11%

Bouches—chocolate with aerated centre. Outer higher density coating=20%, Inner light density (0.65 g/cm$^3$)=80%; small sized gas bubbles 1 to 20 μm.

The composition was used to prepare a drink by mixing it with hot water.

A sensory panel of 36 participants showed a marked liking of the composition against one without Bouches. The numbers preferring the composition of the present invention are as follows:

Taste (Coffee and chocolate combination)=30
Mouthfeel=25
Texture=24
Foam=21

EXAMPLE 8

The following composition was prepared by mixing together the components.
Foaming creamer—(supplier Keivit)=30%
Non-foaming creamer (supplier Keivit)=10.8%
Sugar (supplier Tate & Lyle)=37%
Coffee—Maxwell House=5%
Cocoa powder—Suchard=4%
Flavour (Vanilla supplied by IFF)=0.6%
Salt=0.6%
Chocolate granules (Bouches), sizes ranging from 1 to 9 mm, average size 5 mm=12%

The composition was used to prepare a drink by mixing it with hot water.

A sensory panel of 36 participants showed a very marked liking of the composition against one without Bouches. The numbers preferring the composition of the present invention are as follows:

Taste (Coffee and chocolate combination)=31
Mouthfeel=27
Texture=28
Foam=32
Generates extra creamy (small bubble) foam, whilst half way through the drink

EXAMPLE 9

The following composition was prepared by mixing together the components.
Foaming creamer—(supplier Keivit)=30%
Non-foaming creamer (supplier Keivit)=10.8%
Sugar (supplier Tate & Lyle)=37%
Coffee—Maxwell House=5%
Cocoa powder—Suchard=4%
Flavour (Vanilla supplied by IFF)=0.6%
Salt=0.6%
Chocolate granules (Terry's Orange), sizes ranging from 1 to 9, average size 5 mm=12%

Terry' orange—chocolate with orange flavour.
The composition was used to prepare a, drink by mixing it with hot water.

A sensory panel of 36 participants showed a marked liking of the composition against one without Terry's Orange. The numbers preferring the composition of the present invention are as follows:

Taste (Coffee and chocolate combination)=34
Mouthfeel=24
Texture=23
Foam=17

EXAMPLE 10

The following composition was prepared by mixing together the components.
Foaming creamer—(supplier Keivit)=31%
Non-foaming creamer (supplier Keivit)=11.8%
Sugar (supplier Tate & Lyle)=37%
Coffee—Maxwell House=5%
Cocoa powder—Suchard=4%
Flavour (Vanilla supplied by IFF)=0.6%
Salt=0.6%
Chocolate granules (Pralines), sizes ranging from 1 to 14 mm, average size 7.5 mm=10%

Pralines—chocolate with liquor in the centre. Liquor=Bailey's Irish Cream

These Pralines' of size 1-14 mm were specially prepared by co-extrusion to incorporate liquor in the centre The composition was used to prepare a drink by mixing with hot water.

A sensory panel of 36 participants showed a marked liking of the composition against one without Praline. The numbers preferring the composition of the present invention are as follows:

Taste (Coffee and chocolate combination)=30
Mouthfeel=29
Texture=24
Foam=17

EXAMPLE 11

The following composition was prepared by mixing together the components.
Foaming creamer—(supplier Keivit)=31%
Non-foaming creamer (supplier Keivit)=10%
Sugar (supplier Tate & Lyle)=37%
Coffee—Maxwell House=5%
Cocoa powder—Suchard=4%
Flavour (Vanilla supplied by IFF)=0.6%
Salt=0.6%
Chocolate granules (Toblerone), sizes ranging from 1 to 9 mm, average size 5 mm=11.5%
Capsules containing coffee aroma=0.3%

The composition was used to prepare a drink by mixing it with hot water.

A sensory panel of 36 participants showed a marked liking of the composition against one without Toblerone. The numbers preferring the composition of the present invention are as follows:

Taste (Coffee and chocolate combination)=32
Mouthfeel=23
Texture=24
Foam=17
Cup-aroma=32

EXAMPLE 12

The following composition was prepared by mixing together the components.
Foaming creamer—(supplier Keivit)=31%
Non-foaming creamer (supplier Keivit)=10%
Sugar (supplier Tate & Lyle)=37%
Coffee—Maxwell House=5%
Cocoa powder—Suchard=4%

Flavour (Vanilla supplied by IFF)=0.6%
Salt=0.6%
Chocolate granules (Toblerone), sizes ranging from 1 to 9 mm, average size 5 mm=11.5%
Capsules containing vanilla aroma (supplied by IFF)=0.3%

The composition was used to prepare a drink by mixing it with hot water.

A sensory panel of 36 participants showed a marked liking of the composition against one without Toblerone. The numbers preferring the composition of the present invention are as follows:
Taste (Coffee and chocolate combination)=32
Mouthfeel=23
Texture=24
Foam=17
Cup-aroma=28

EXAMPLE 13

The following composition was prepared by mixing together the components.
Foaming creamer—(supplier Keivit)=31%
Non-foaming creamer (supplier Keivit)=10%
Sugar (supplier Tate & Lyle)=37%
Coffee—Maxwell House=5%
Cocoa powder—Suchard=4%
Flavour (Vanilla supplied by IFF)=0.6%
Salt=0.6%
Chocolate granules (Toblerone), sizes ranging from 1 to 9 mm. Average size 5 mm=11.8%.
(Chocolate Contains 1% Multi-Vitamins)

The composition was used to prepare a drink by mixing it with hot water.

A sensory panel of 36 participants showed a marked liking of the composition against one without Toblerone. The numbers preferring the composition of the present invention are as follows:
Taste (Coffee and chocolate combination)=32
Mouthfeel=23
Texture=24
Foam=17
Cup-aroma=28

The invention claimed is:

1. A layered coffee beverage comprising:
   instant coffee;
   a creamer;
   confectionery particles having a size of at least 1 mm;
   wherein the confectionery particles comprise:
   a chocolate part having a density of greater than 1 g/cm$^3$; and
   a non-chocolate part having a density of less than 1 g/cm$^3$;
   wherein the non-chocolate part comprises a toffee, fudge, biscuit or nougat;
   wherein the instant coffee, the creamer, and the confectionery particles form the layered coffee beverage with a bottom layer formed by the chocolate part, a top layer formed by the non-chocolate part, and a middle layer formed by the instant coffee positioned between the bottom layer and the top layer.

2. A layered coffee beverage according to claim 1 wherein the confectionery particles have a size of from 1 to 9 mm.

3. A layered coffee beverage according to claim 1 wherein the chocolate part further comprises a solid chocolate and an aerated chocolate.

4. A layered coffee beverage according to claim 1 wherein the confectionery particles further comprise the non-chocolate part having a density of less than 1 g/cm$^3$ at least partially covered by the chocolate part.

5. A layered coffee beverage according to claim 1 wherein the confectionery particles further comprise the chocolate part with the non-chocolate part having a density of less than 1 g/cm$^3$ embedded therein.

6. A layered coffee beverage according to claim 1 which comprises from 1 to 20 wt % of said confectionery particles based on the total weight of the composition.

7. A process for preparing a layered coffee beverage as defined in claim 1 which comprises mixing together the confectionery particles, the creamer and the instant coffee.

8. A process for preparing the layered coffee beverage as defined in claim 7, which further comprises mixing hot water with the confectionery particles, the creamer, and the instant coffee.

9. A layered coffee beverage according to claim 1 wherein the instant coffee and the creamer each include a plurality of instant coffee particles and creamer particles, the confectionery particles being larger than each of the instant coffee particles and the creamer particles.

10. A layered coffee beverage according to claim 1 wherein the confectionery particles include a plurality of gas bubbles entrapped therein.

11. A layered coffee beverage according to claim 10 wherein the gas bubbles have a size from 1 to 20 μm.

12. A layered coffee beverage according to claim 11 wherein the layered coffee beverage includes foam provided by the gas bubbles entrapped in the confectionery particles.

13. A layered coffee beverage according to claim 1 further comprising hot water.

14. A layered coffee beverage according to claim 1 wherein the creamer is a foaming creamer.

15. A layered coffee beverage according to claim 1 wherein each of the top, middle, and bottom layer of the layered coffee beverage is a liquid layer.

* * * * *